United States Patent [19]
Guffrey

[11] Patent Number: 5,167,509
[45] Date of Patent: Dec. 1, 1992

[54] EDUCATIONAL PUZZLE

[76] Inventor: Brian Guffrey, 2110 Firwood Ave., Santa Rosa, Calif. 95401

[21] Appl. No.: 730,384

[22] Filed: Jul. 15, 1991

Related U.S. Application Data

[63] Continuation of Ser. No. 488,682, Mar. 5, 1990, abandoned.

[51] Int. Cl.⁵ .............................................. G09B 3/00
[52] U.S. Cl. .................................... 434/333; 434/200
[58] Field of Search ............... 434/200, 209, 333, 347, 434/406

[56] References Cited

U.S. PATENT DOCUMENTS

| | | | |
|---|---|---|---|
| 760,384 | 5/1904 | Dieterich | 434/333 |
| 1,400,887 | 12/1921 | Liebman | 434/200 |
| 1,403,989 | 1/1922 | Verneau | 434/209 |
| 2,659,163 | 11/1953 | Albee | 273/157 R X |
| 3,707,287 | 12/1972 | Spector | 434/333 X |
| 4,188,734 | 2/1980 | Rich | 434/200 X |
| 4,586,714 | 5/1986 | Lenkoff et al. | 273/157 R |
| 4,687,203 | 8/1987 | Spector | 434/347 X |

FOREIGN PATENT DOCUMENTS

| | | | |
|---|---|---|---|
| 744637 | 2/1956 | United Kingdom | 434/333 |
| 905710 | 9/1962 | United Kingdom | 434/333 |
| 1208949 | 10/1970 | United Kingdom | 434/333 |
| 2058584 | 4/1981 | United Kingdom | 273/157 R |
| 2063078 | 6/1981 | United Kingdom | 434/333 |

Primary Examiner—Richard J. Apley
Assistant Examiner—Karen Ann Richard
Attorney, Agent, or Firm—Flynn, Thiel, Boutell & Tanis

[57] ABSTRACT

An educational puzzle including a board having a plurality of identical openings extending therethrough and each receiving an identically shaped removable board piece. Each board piece, on the front side thereof, is provided with indicium such as alpha or numeric indicium so that the respective piece is correctly positionable in only one or a selected number of openings according to the overall purpose of the puzzle. The back side of the board and board pieces define one or more lines or patterns which are visible only from the back side. When all of the board pieces are properly inserted into the respective openings, then continuous lines are formed on the back side of the board to provide a visual determination that the puzzle has been solved correctly.

9 Claims, 3 Drawing Sheets

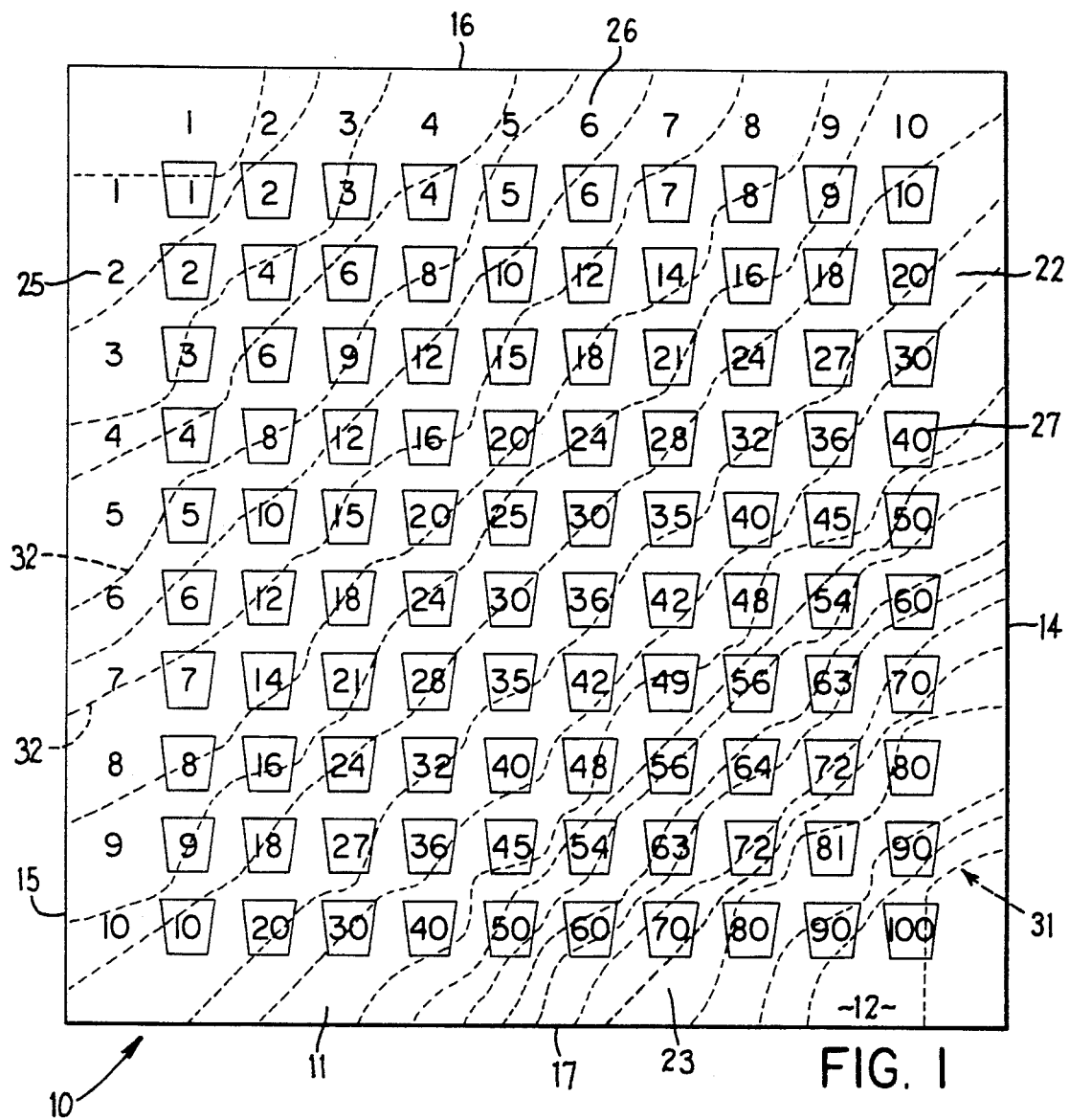
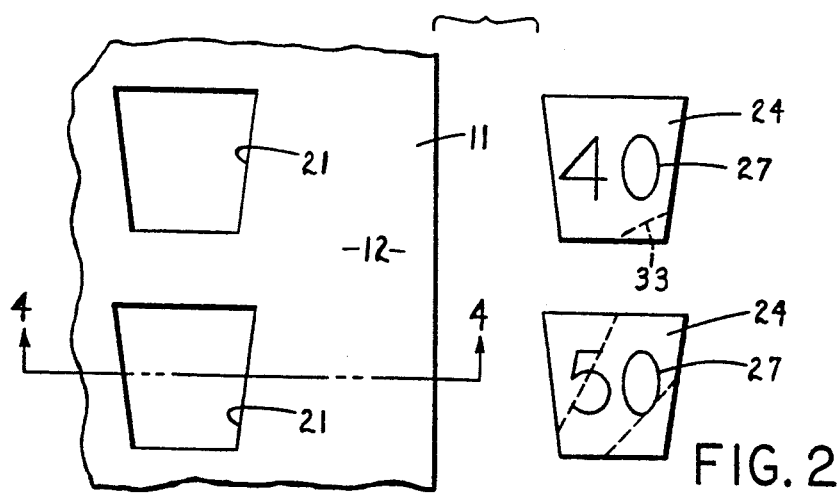

EDUCATIONAL PUZZLE

This application is a continuation of U.S. Ser. No. 07/488,682, filed Mar. 5, 1990, now abandoned.

FIELD OF THE INVENTION

This invention relates to an educational device, specifically a puzzle-type device to assist young children in learning mental skills such as mathematical or alphabetical functions, and which at the same time can be entertaining to the user.

BACKGROUND OF THE INVENTION

Numerous devices such as flash cards and the like have been developed to assist young children with respect to learning mathematic and alphabetic relationships. Some of these known devices have also involved arrangements wherein separate pieces have different mathematical or alphabetical functions expressed thereon, which pieces are intended to cooperate in a selected relationship. In many cases the separate pieces have different shapes, and only by putting together pieces with the proper shape can a proper solution be obtained. In other known devices, while the child may manipulate separate pieces, nevertheless often times the child has no ability to determine if a correct solution has been achieved.

Accordingly, it is an object of this invention to provide an improved educational device, specifically a puzzle, which is believed beneficial in assisting young children with respect to learning mental relationships such as mathematic or alphabetic relationships, and which also permits the child to readily determine if he/she has arrived at a correct solution. This puzzle is also believed to be such as to provide entertainment for the child, during use thereof, so as to facilitate their desire to improve not only their mental capabilities but also their manual dexterities.

According to the present invention, the puzzle comprises a board having a plurality of openings extending therethrough between the front and back surfaces of the board. The openings are all of identical configuration, and each receives an identically shaped removable board piece. Each board piece, on the front side thereof, is provided with indicium such as alpha or numeric indicium so that the respective piece is correctly positionable in only one or a selected number of openings according to the overall purpose of the puzzle. The back side of the board and board pieces define one or more lines or patterns which are visible only from the back side, and which define continuous lines only when the individual board pieces are inserted into the proper openings. When all of the board pieces are properly inserted into the respective openings, then continuous lines are formed on the back side of the board and hence provide the child with an ability to determine that he/she has reached a correct solution. If any of the pieces are inserted into the wrong openings, at least one or more of the lines on the back side of the board will be broken, thereby indicating an incorrect solution. The lines can, if desired, be disposed in an orientation to create a geometric shape or picture.

Other objects and purposes of the invention will be apparent after reading the following specification and inspecting the accompanying drawings.

BRIEF DESCRIPTION OF THE DRAWINGS

FIG. 1 is a top view of a first embodiment of the puzzle according to the present invention, which puzzle represents a 10×10 multiplication table.

FIG. 2 is a fragmentary enlarged view illustrating a part of the puzzle board with two of the board pieces removed from the respective openings.

Figure 3:
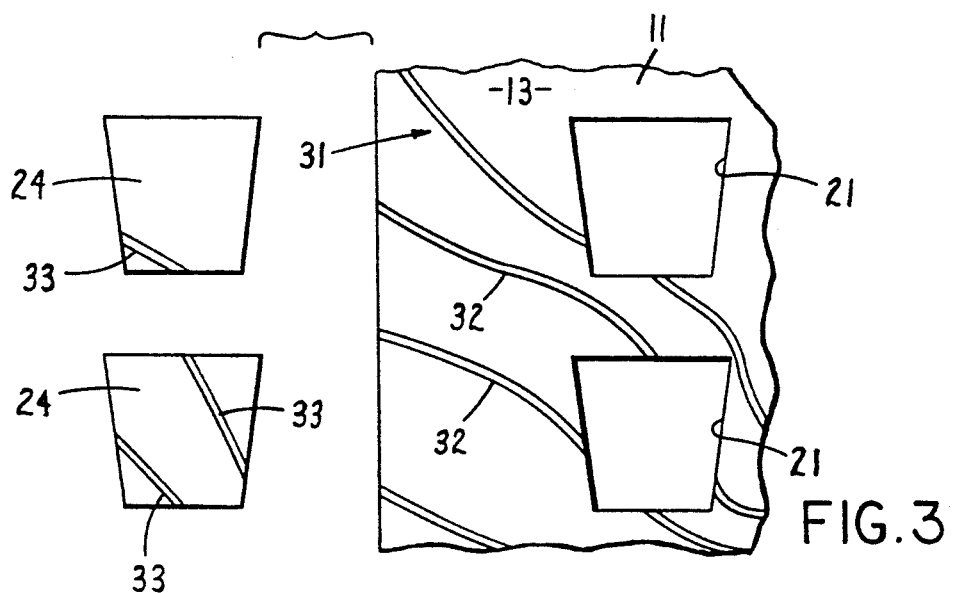
FIG. 3 is a view corresponding to FIG. 2 but illustrating the back side of the board and removed pieces.
Figure 4:
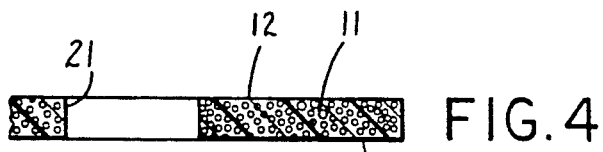
FIG. 4 is a cross sectional view along line 4—4 in FIG. 2.

Certain terminology will be used in the following description for convenience in reference only, and will not be limiting. For example, the words "upwardly", "downwardly", "rightwardly" and "leftwardly" will refer to directions in the drawings to which reference is made. The word "front" will refer to the side of the puzzle which normally faces the user when solving the puzzle, and the word "back" will refer to the opposite side. The words "inwardly" and "outwardly" will refer to directions toward and away from, respectively, the geometric center of the puzzle and designated parts thereof. Said terminology will include the words specifically mentioned, derivatives thereof, and words of similar import.

DETAILED DESCRIPTION

Referring to FIGS. 1-6, there is illustrated a educational device, specifically a puzzle 10, according to the present invention. This puzzle includes a generally horizontally enlarged plate-like board 11 having a substantially planar top surface 12 and a similar substantially planar back surface 13. These surfaces 12 and 13 define opposite sides of the board and are spaced apart solely by the thickness of the board, which thickness is normally rather small, such as a fraction of one inch.

The board 11 has a surrounding peripheral edge which, in the illustrated embodiment, includes generally parallel right and left edges 14 and 15 respectively, which extend between and join to generally parallel top and bottom edges 16 and 17, respectively. It will be appreciated that the shape of the board, while being square in this illustrated embodiment, can be of substantially any selected configuration including any type of polygon defined by a plurality of straight sides or any other geometric shape defined by curved edges or any combination of curved and straight edges.

The board 11 has a plurality of identical openings 21 extending therethrough between the front and back surfaces thereof. These openings 21, as illustrated by FIG. 1, are preferably individually isolated from one another as they project transversely through the board between the front and back surfaces thereof.

In the embodiment illustrated by FIG. 1, the plurality of openings 21 are disposed within a plurality of rows 22 which extend across the board between the opposite side edges, with the openings in adjacent rows being generally aligned within columns 23 which extend between the top and bottom edges.

While the plurality of openings 21 are preferably totally isolated or separated from one another due to intermediate portions of the board therebetween, it will be appreciated that the openings as disposed adjacent one another within rows or within columns can be disposed in partial communication with one another if desired. However, it is preferred that portions of the board be disposed either between adjacent rows or between adjacent columns so as to maintain at least partial separation of adjacent openings, whereby any communication between adjacent openings will hence be limited to communication either between adjacent openings within the same row or between adjacent openings with the same column, but not both.

The puzzle 10 also includes a plurality of removable board pieces 24. These board pieces all have an identical outer edge or configuration, and the number of pieces corresponds to the number of openings 21, so that each board piece 24 has an outer configuration enabling it to be properly positioned within any of the plurality of openings 21.

In the illustrated embodiment, all of the openings 21 and board pieces 24 are illustrated of a generally four-sided or trapezoidal configuration which is wider at the top than at the bottom, whereby the openings and board pieces have a top-to-bottom directionalization. That is, the board pieces will fit into the openings only when properly oriented from top to bottom, thereby preventing insertion of the board pieces into the openings if they are oriented upside down. While this top-to-bottom (or right-to-left) orientation of the openings and pieces is preferred so as to improve the manual dexterity and manipulative skill of the user, nevertheless it is recognized that the openings and pieces can be provided with a configuration which is symmetrical in both the top-to-bottom and left-to-right directions (such as a circle, square or rectangle).

In the illustrated and preferred embodiment, the board 11 is constructed from a closed-cell foamed plastics material, such as Ensolite. Such material results in the board possessing sufficient strength and stiffness so as to retain its configuration, but at the same time having limited resiliency and gripping ability to enable the removable pieces to be snugly and securely held within the openings, but enabling pieces to be readily removed when the user applies finger pressure against either the front or back side of the pieces so as to push them out of the respective openings. It will be recognized that numerous other materials are suitable for use in manufacture of the board and removable pieces.

In the embodiment illustrated by FIG. 1, the upper surface of the board is provided with indicium 25 provided thereon, which indicium in the illustrated embodiment are the numbers 1 through 10 as disposed in a column along the adjacent left side of the board so that the indicium 25 designates the various vertically adjacent and vertically spaced rows of openings 21 and their removable pieces 24.

In similar fashion, indicium 26 is also provided on the upper surface of the board and is disposed substantially within a row extending along the upper edge, with the indicium 26 again being the numbers 1 through 10 oriented sequentially in a row so as to effectively identify the 10 columns of openings 21 and associated pieces 24.

The removable board pieces 24 have indicium 27 provided on the front faces thereof, which indicium is representative of the overall solution to the puzzle. This solution indicium 27 usually only on the front sides of the removable board pieces, but the indicium could appear on both the front and back sides of the removable board pieces. Further, the solution indicium 27 as appearing on the front surfaces of the board pieces represent a number of distinctly different indicium as defined on the individual board pieces, although the indicium on the front side of some of the board pieces may be identical depending upon the skill function being taught by the puzzle.

The puzzle also contains means to determine that it has been properly solved, and such is indicated generally by the verification indicium 31 as provided on the back (lower) surface 13. This verification indicium, in the illustrated embodiment, comprises a plurality of elongate lines or bands 32 which in this embodiment are each continuous as they extend across the back surface for termination at the peripheral edge of the board. These lines are formed on the back surface of the board and on the back surface of the removable pieces 24 (and hence are shown in dotted lines in FIG. 1) so that each removable piece (except for possibly one) has at least a segment 33 of at least one line 32 formed on the back surface thereon, such as indicated by the segments 33 in FIGS. 2 and 3. This verification indicium 33 is visible solely from the back side of the board.

To permit proper solution and verification of the puzzle, all of the board pieces 24 which have a different solution indicium 27 on the front (upper) surface thereof also have a different verification line segment indicium 33 on the back (lower) surface thereof. However, since proper solution to the puzzle may involve one or more groups of removable pieces each having the same solution indicium 27 on the front side thereof, then all such pieces would also have identical verification indicium 33 on the rear side thereof.

Figure 5:
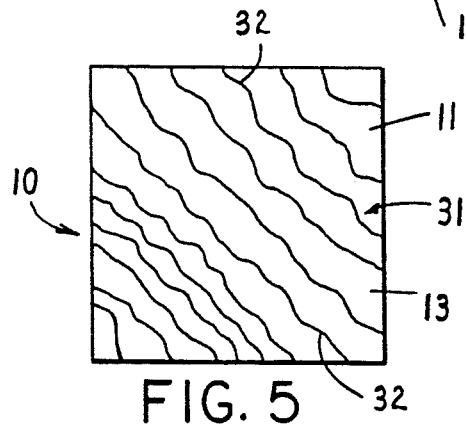
FIG. 5 is a view, on a reduced scale, of the back side of the board shown in FIG. 1.
Figure 6:
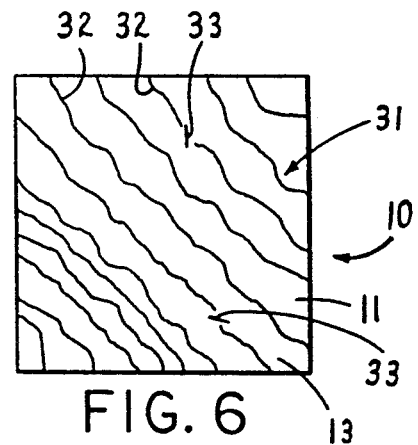
FIG. 6 is a view similar to FIG. 5, but illustrating the back side of the board when some of the individual pieces are improperly positioned.

The verification indicium 31, and specifically the lines 32, are such as to create continuous lines which are readily visible to the child after the child has inserted all of the pieces 24 into the openings 21 and then turns the puzzle over to view the back side thereof. If the pieces 24 are all properly positioned within the respective openings 21 so as to present a proper solution to the puzzle, then each of the visual verification lines 32 on the back side will be continuous as illustrated by FIG. 5. However, if some of the puzzle pieces 24 are inserted into the wrong openings 21, then due to the fact that each board piece 24 which represents a different solution indicium 27 has a different verification indicium 33, then this results in one or more of the verification lines 32 being broken or discontinuous as illustrated by FIG. 6, and hence this enables the child to readily locate his error and permit proper correction of the puzzle so as to result in a correct solution.

An explanation as to the use of a sample puzzle, with reference to the embodiment of FIGS. 1-6 will now be given.

In this embodiment of the puzzle represented by the front side as shown by FIG. 1, the puzzle board 11 has the indicia 25 (multiplicands) and 26 (multipliers) each representing the numbers 1 through 10 for identifying the various rows and columns, whereby these indicia create a 10×10 multiplication table. These indicia 25 and 26 serve to correlate the board pieces 24 with the openings 21 as follows. By selecting any one of the numbers defining one of the rows and multiplying it by any one of the numbers identifying a selected column, then where the selected row and column intersect there is defined an opening 21 into which is inserted a board piece 24 having solution indicium 27 thereon which represent the solution to the multiplication of the two selected numbers. For example, selecting the row 4 and the column 6 indicates that the solution achieved by multiplying 4×6, as disposed at the intersection of the selected row and column, is 24. Of course, with this type of mathematical function, it will recognized that by selecting row 6 and column 4, there is another identical solution 24. Thus, these two removable board pieces have not only the identical solution indicium on the front side but also the identical verification indicium 33 on the rear side.

Thus, with all of the board pieces 24 removed from the puzzle, a child can systematically go through the individual multiplication functions in an attempt to insert the correct solution pieces. This might be accomplished by the child actually going through the multiplication steps and sequence, either by row or column, and then locating the correct board piece 24 and inserting it into the proper opening 21. Alternatively, the child may merely select a board piece 24 at random and, based on the solution indicium 27 on the front side thereof, attempt to locate the proper opening 21 in the board. After the child has inserted all of the pieces into the board openings, the board can then be readily turned over and, if all pieces have been properly inserted, a correct solution will appear as indicated in FIG. 5. However, if some pieces are incorrect, then some of the verification lines 32 will be broken as indicated in FIG. 6, thereby indicating to the child that an error has been made.

Figure 7:
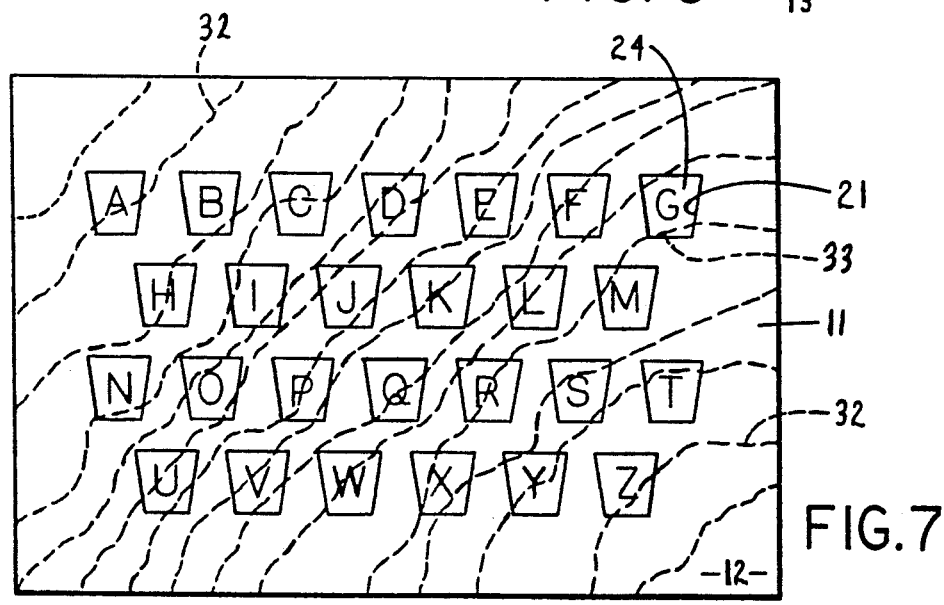
FIG. 7 is a top view of a second embodiment of the invention wherein the puzzle is designed for teaching the alphabet.

Referring now to FIG. 7, there is illustrated a second variation which is constructed substantially identical to the multiplication puzzle of FIGS. 1-6 except that the FIG. 7 variation is a puzzle which, in terms of the indicium on the front side of the pieces, involves the alphabet. That is, each removable piece has one of the letters of the alphabet on the front side thereof and hence the puzzle enables the child to practice putting the pieces into the board in proper alphabetic sequence. Again, assuming that this is accomplished, then all of the indicia lines on the back side, as indicated by dotted lines in FIG. 7, will be continuous. However, if any of the letters are improperly positioned, then one or more of the lines will have a break or discontinuity therein so as to indicate to the child that an error has occurred.

Figure 8:
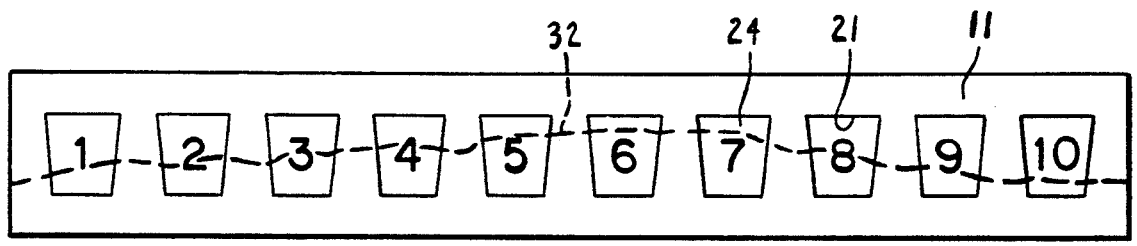
FIG. 8 is a top view of a third embodiment wherein the puzzle is designed for teaching the sequence of numbers from 1 to 10.

FIG. 8 illustrates a third variation wherein the series of removable pieces are provided solely so as to permit a child to practice proper orientation or sequence with respect to a selected series of numbers, such as numbers from 1 to 10. In this case, all of the openings can be oriented in a single row, whereby only a single verification line need be provided on the back side of the board so as to intersect the openings and extend across the individual board pieces. The visual solution indicium on the front, and the verification indicium on the back, on each piece is different so that each piece has only a single opening in which it can be properly positioned. If two or more of the pieces are improperly positioned, then the verification line 32 is not continuous, but rather has breaks therein which a readily visible to the child.

Figure 9:
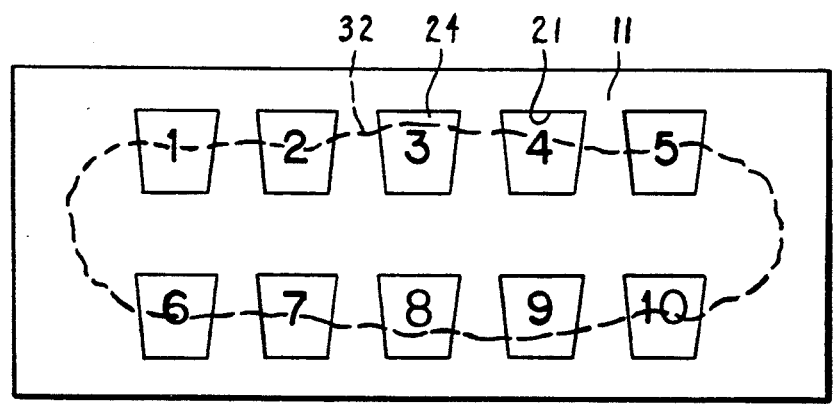
FIG. 9 illustrates a fourth embodiment for again teaching the sequencing of numbers from 1 to 10.

FIG. 9 illustrates a fourth variation which is similar to FIG. 8 except that the openings are in several rows, and again the illustrated embodiment is for permitting sequencing of a series of numbers. The puzzle again includes only a single verification line on the back side, which verification line for a proper solution to the puzzle is continuous. Further, as is illustrated by this embodiment, the verification line may constitute a continuous endless loop when the puzzle is properly solved, which loop will be broken in the event of an improper solution.

It will be appreciated that the verification indicia on the back side of the puzzle may obviously assume other configurations such as a plurality of loops possibly in surrounding relationship to one another, or the lines may constitute a combination of both endless loops and lines which terminate at the board periphery so as to define any type of geometric arrangement or pattern. Further, the lines defining the verification indicia can also be disposed so as to create a picture of a specific object or thing.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An educational puzzle, comprising a thin plate-like board having oppositely facing upper and lower surfaces, said board having a plurality of substantially identical openings extending perpendicularly therethrough between said upper and lower surfaces, a plurality of removable board pieces adapted to be stationarily positioned within said plurality of openings for filling said openings, said plurality of board pieces all having a peripheral configuration which substantially identically corresponds to the peripheral configuration of said openings so that each said board piece can be stationarily positioned within any one of said openings, said openings having a nonsymmetrical configuration in at least one transverse direction so that the board pieces can be disposed only in one orientation so as to permit insertion of the board piece into the opening, a visual indicium provided on an upper surface of each said removable board piece, the visual indicium as provided on at least several of said board pieces being different so that said board pieces are properly positionable only in selected ones of said openings for creating a predetermined visual arrangement on the upper surface of the board when the plurality of board pieces are properly disposed within the individual openings of said plurality, visual verification indicia means provided on the lower surface of said board and on a lower surface of said board pieces for visually indicating that the individual board pieces have been positioned within the proper openings, and said upper surface of said board being provided with visual correlation indicia means for permitting each said opening to be uniquely visually associated with a respective said visual indicium for indicating which of said board pieces are properly positionable in each of said opening; and said visual verification indicia means, said visual indicium, and said visual correlation indicia means all being visible externally of said board when said board pieces are positioned within said openings.

2. A puzzle according to claim 1, wherein said visual indicia of said board pieces define a predetermined indicium sequence, said board openings being arranged in a predetermined geometric pattern, said indicium sequence and said geometric pattern of openings completely defining which said board piece is properly positionable in each said opening to create said predetermined visual arrangement on said upper surface of said board.

3. A puzzle according to claim 1, wherein said visual indicium as provided on each of said board pieces is different from the visual indicium on the remaining board pieces so that each said board piece is properly positionable only in a single one of said openings.

4. A puzzle according to claim 1, wherein said board is constructed in one piece from a foamed plastics material having limited resiliency, said board pieces also being constructed from said foamed plastics material, said board pieces being snugly yieldably gripped by said board when inserted into said openings.

5. An educational puzzle comprising a thin plate-like board having oppositely facing upper and lower surfaces, said board having a plurality of substantially identical openings extending perpendicularly therethrough between said upper and lower surfaces, said plurality of openings in said board being disposed in substantially non-adjoining relationship to one another, a plurality of removable board pieces adapted to be stationarily positioned within said plurality of openings for filling said openings, said plurality of board pieces all having a peripheral configuration which substantially identically corresponds to the peripheral configuration of said openings so that each said board piece can be stationarily positioned within any one of said openings, said opening and said board pieces having a non-symmetrical configuration in at least one transverse direction so that the board pieces can be disposed only in one orientation so as to permit insertion of the board piece into the openings, said board being constructed in one piece of a foamed plastics material having limited resilience, said board pieces also be constructed from said foamed plastics material and being snugly yieldably gripped around edges thereof by said board when said board pieces are inserted into said openings, a visual indicium provided on an upper surface on each said removable board pieces, the visual indicium as provided on at least several of said board pieces being different so that said board pieces are properly positionable only in selected ones of said opening for creating a predetermined visual arrangement on the upper surface of the board when the plurality of board pieces are properly disposed within the individual openings of said plurality, visual correlation indicia means provided on the upper surface of said board for permitting each said opening to be uniquely visually associated with a respective said visual indicium for indicating which of said board pieces are properly positionable in each said opening, said plurality of openings being disposed in substantially perpendicularly extending rows and columns, said visual correlation indicia means including a first row of numerals extending in a first direction on said upper surface so that one of said numerals is associated with each row of said openings, said visual correlation indicia means including a second row of numerals on said upper surface extending in a second direction which is approximately perpendicular to said first direction so that a said numeral of said second row is associated with each column of said openings, said first and second rows of numerals defining multiplicands and multipliers of a multiplication table, said visual indicium as provided on the upper surface of each said board piece comprising a numeral which represents the product obtained by multiplying one of the multiplicands by one of the multipliers, and visual verification indicia means provided on the lower surface of said board and on lower surfaces of said board pieces for visually indicating that the individual board pieces have been positioned within the proper openings, said visual verification indicia means including a plurality of lines which are formed on the bottom surfaces of the board and board pieces so as to create line segments which extend across the bottom surfaces of the board pieces and align with corresponding line segments formed on the bottom surface of the board only when the board piece is inserted into the proper opening, all of the board pieces having different numerals on the upper surface thereof also having different line segments on the bottom surface thereof.

6. An educational puzzle comprising a thin plate-like board having oppositely facing upper and lower surfaces, said board having a plurality of substantially identical openings extending perpendicularly therethrough between said upper and lower surfaces, said plurality of openings in said board being disposed in substantially non-adjoining relationship to one another, a plurality of removable board pieces adapted to be stationarily positioned within said plurality of openings for filling said openings, said plurality of board pieces all having a peripheral configuration which substantially identically corresponds to the peripheral configuration of said openings so that each said board piece can be stationarily positioned within any one of said openings, said openings and said board pieces having a non-symmetrical configuration in at least one transverse direction so that the board pieces can be disposed only in one orientation so as to permit insertion of the board piece into the openings, said board being constructed in one piece of a foamed plastics material having limited resiliency, said board pieces also be constructed from said foamed plastics material and being snugly yieldably gripped around edges thereof by said board when said board pieces are inserted into said openings, a visual indicium provided on an upper surface on each said removable board piece, the visual indicium as provided on each said board piece being different so that each said board piece is properly positionable only in a selected one of said opening for creating a predetermined visual arrangement on the upper surface of the board when the plurality of board pieces are properly disposed within the individual openings of said plurality, and visual verification indicia means provided on the lower surface of said board and on lower surfaces of said board pieces for visually indicating that the individual board pieces have been positioned within the proper openings, said visual verification indicia means including a plurality of lines which are formed on the bottom surfaces of the board and board pieces so as to create line segments which extend across the bottom surfaces of the board pieces and align with corresponding line segments formed on the bottom surface of the board only when the board piece is inserted into the proper opening, all of the board pieces having different line segments on the bottom surface thereof.

7. An education puzzle, comprising a thin plate-like board having oppositely facing upper and lower surfaces said board having a plurality of substantially identical openings extending perpendicularly therethrough between said upper and lower surfaces, a plurality of removable board pieces adapted to be stationarily positioned within said plurality of openings for filling said openings, said plurality of board pieces all having a peripheral configuration which substantially identically corresponds to the peripheral configuration of said openings so that each said board piece can be stationarily positioned within any one of said openings, a visual indicium provided on an upper surface of each said removable board piece, the visual indicium as provided on at least several of said board pieces being different so that said board pieces are properly positionable only in selected ones of the upper surface of the board when the plurality of board pieces are properly disposed within the individual openings of said plurality, visual verification indicia means provided on the lower surface of said board pieces for visually indicating that the individual board pieces have been positioned within the proper openings, and said upper surface of said board being provided with visual correlation indicia means for permitting each said opening to be uniquely visual associated with a respective said visual indicium for indicating which of said board pieces are properly positionable in each said opening;

said visual verification indicia means, said visual indicium, and said visual correlation indicia means all being visible externally of said board when said board pieces are positioned within said openings; and at least two of said board pieces have substantially identical visual indicium on said upper surfaces thereof, said two board pieces also having substantially identical visual verification indicia on said lower surface thereof, two of said board openings without breaking a continuous elongate line of said visual verification indicia means.

8. A puzzle according to claim 7, wherein said visual correlation indicia means includes a first row of numerals extending in a first direction on said upper surface and a second row of numerals extending in a second direction on said upper surface, said second direction being approximately perpendicular to said first direction, said first and second rows of numerals respectively defining multiplicands and multipliers of a multiplication table. corresponding to said two board pieces, and said two board pieces being interchangeably positionable in said two board openings 9. An educational puzzle, comprising a thin plate-like board having oppositely facing upper and lower surfaces, said board having a plurality of substantially identical openings extending perpendicularly therethrough between said upper and lower surfaces, a plurality of removable board pieces adapted to be stationarily positioned within said plurality of openings for filling said openings, said plurality of board pieces all having a peripheral configuration which substantially identically corresponds to the peripheral configuration of said openings so that each said board piece can be stationarily positioned within any one of said openings, a visual indicium provided on an upper surface of each said removable board piece, the visual indicium as provided on at least several of said board pieces being different so that said board pieces are properly positionable only in selected ones of said openings for creating a predetermined visual arrangement on the upper surface of the board when the plurality of board pieces are properly disposed within the individual openings of said plurality, visual verification indicia means provided on the lower surface of said board and on a lower surfaces of said board pieces for visually indicating that the individual board pieces have been positioned within the proper openings, said visual verification indicia means consisting entirely of a plurality of continuous lines which extend on the lower surfaces of the board and properly-positioned board pieces in mutually non-intersecting and non-contacting relationship with one another, and said upper surface of said board being provided with visual correlation indicia means for permitting each said opening to be uniquely visually associated with a respective said visual indicium for indicating which of said board pieces are properly positionable in each said opening; and said visual verification indicia means, said visual indicium, and said visual correlation indicia means all being visible externally of said board when said board pieces are positioned within said openings.

* * * * *

UNITED STATES PATENT AND TRADEMARK OFFICE
CERTIFICATE OF CORRECTION

PATENT NO. : 5 167 509
DATED : December 1, 1992
INVENTOR(S) : Brian Guffrey It is certified that error appears in the above-identified patent and that said Letters Patent is hereby corrected as shown below:

Column 9, line 34; change "surface" to ---surfaces---.
Column 9, line 34; after "openings" insert
---corresponding to said two board pieces, and said two board pieces being interchangeably positionable in said two board openings---.

Column 10, line 1; delete "corresponding to said two board pieces, and---.
Column 10, lines 2 and 3; delete in their entirety.

Signed and Sealed this

Thirtieth Day of November, 1993

*Attest:*

BRUCE LEHMAN

*Attesting Officer*     *Commissioner of Patents and Trademarks*